Figure 1:
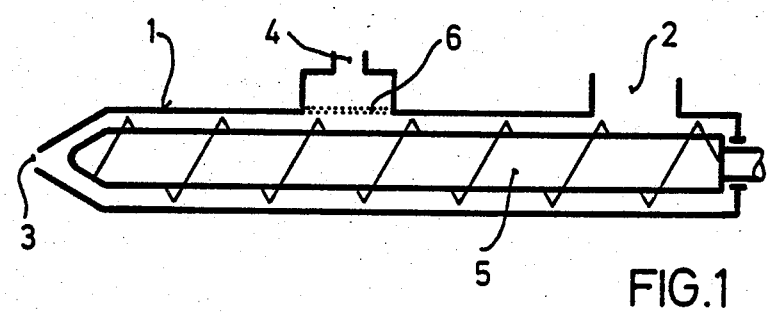

United States Patent [19]

Pipper et al.

[11] Patent Number: 4,578,455

[45] Date of Patent: Mar. 25, 1986

[54] PROCESS AND APPARATUS FOR REMOVING VOLATILE CONSTITUENTS FROM POLYMER MELTS OR PASTES

[75] Inventors: Gunter Pipper, Bad Durkheim; Siegfried Riegger, Mannheim; Josef G. Floss, Neustadt, all of Fed. Rep. of Germany

[73] Assignee: BASF Aktiengesellschaft, Ludwigshafen, Fed. Rep. of Germany

[21] Appl. No.: 724,500

[22] Filed: Apr. 18, 1985

Related U.S. Application Data

[63] Continuation of Ser. No. 591,596, Mar. 20, 1984, abandoned.

[30] Foreign Application Priority Data

Mar. 24, 1983 [DE] Fed. Rep. of Germany ....... 3310676

[51] Int. Cl.$^4$ .................................................. C08F 6/28
[52] U.S. Cl. .................................... 528/501; 264/102; 425/203
[58] Field of Search ........................ 425/203; 264/102; 528/501

[56] References Cited

U.S. PATENT DOCUMENTS

| | | | |
|---|---|---|---|
| 2,712,799 | 7/1955 | Braibanti et al. | 264/102 X |
| 3,177,181 | 4/1965 | Baum et al. | 528/501 X |
| 3,437,638 | 4/1969 | Bottenbruch et al. | 528/501 X |

*Primary Examiner*—Paul R. Michl
*Attorney, Agent, or Firm*—Keil & Weinkauf

[57] ABSTRACT

A process for removing volatile constituents from polymer melts or pastes, wherein the polymer or paste containing the volatile constituents is passed, with continuous formation of fresh surfaces, through one or more zones in which the volatile constituents evaporate, and the volatile constituents are removed from the zone or zones in which they evaporate through, in each case, a plurality of porous orifices, and an apparatus for carrying out said process.

1 Claim, 2 Drawing Figures

PROCESS AND APPARATUS FOR REMOVING VOLATILE CONSTITUENTS FROM POLYMER MELTS OR PASTES

This application is a continuation of application Ser. No. 591,596, filed on Mar. 20, 1984, now abandoned.

The removal of volatile constituents from polymer melts or pastes is amongst the most important steps in the process of preparation and working up of polymers. Examples of volatile constituents to be removed are water, solvents, monomers, oligomers, inert gases and reaction products. Screw extruders are particularly suitable for carrying out the devolatilization step, because a large heat-transfer surface can be provided, energy distribution is good and the surface of the polymers to be processed undergoes renewal. However, reliable removal of the streams of vapor in the devolatilization zone must be ensured since otherwise the venting orifices may become flooded and polymer particles become entrained. This has the effect that polymer deposits in the venting orifices and undergoes thermal decomposition, in turn leading to contamination of the polymer being devolatilized. A number of experiments with the object of solving this problem have been carried out; these have included narrowing the venting orifices by having a horizontal discharge edge and intake pocket, or by having a saddle cover and intake pocket. However, these methods substantially reduce the cross-section of the venting orifice without ultimately solving the problem in question. At very high vapor velocities, or in cases where the polymer has a high tendency to froth, venting orifices have also been fitted with self-purging stuffing screws which force the rising melt back again. However, such stuffing screws are very expensive.

It is an object of the present invention to provide a method for removing volatile constituents from a polymer melt or paste, wherein no decomposition products can pass back from the venting orifices into the polymer melt or paste.

We have found that this object is achieved by a process for removing volatile constituents from a polymer melt or paste by passing the polymer or paste containing the volatile constituents, with continuous formation of fresh surfaces, through one or more zones in which the volatile constituents evaporate and removing the said constituents, wherein the volatile constituents are removed from the zone or zones in which they evaporate through, in each case, a plurality of porous orifices.

The invention also provides an apparatus for removing volatile constituents, which comprises an extruder barrel 1 having a feed orifice 2 for a polymer or paste containing volatile constituents, a discharge orifice 3, one or more venting orifices 4 and one or more screws 5, wherein a porous plate 6 covering the entire cross-section of the venting orifice is arranged in each venting orifice.

The novel process and the novel apparatus have the advantage that the backflow of decomposition products from the venting orifice into the polymer melt or paste is effectively prevented in a simple manner.

According to the invention, a polymer melt which contains volatile constituents such as water, solvents, monomers, oligomers, inert gases and vapours or reaction products, is used.

Such volatile constituents can be present in the polymer melts in amounts of, for example, from 0.1 to 50% by weight, based on the amount of polymer plus volatile constituents. Examples of polymers, containing volatile constituents, which may be treated by the novel process are nylons, such as nylon-6 and nylon-6,6, styrene polymers, such as polystyrene, styrene/acrylonitrile copolymers, rubber-modified styrene polymers and copolymers and polyolefins. Typical starting materials are a nylon-6 containing up to 15% by weight of monomers and oligomers, a nylon-6,6 containing up to 10% by weight of volatile constituents such as water and volatile amines, a polystyrene containing up to 40% by weight of monomers, oligomers and possibly solvents, such as ethylbenzene, a styrene/acrylonitrile copolymer containing up to 50% by weight of monomers, oligomers and possibly solvents, or a polyethylene containing up to 10% by weight of volatile constituents. The volatile constituents can also result from elimination during condensation, for example in the case of nylons made from diamines and dicarboxylic acids or in the case of polyesters such as polyethylene terephthalate or polybutylene terephthalate, or through degradation of unstable constituents of the polymer, as in the case of polyoxymethylene.

Other suitable starting materials for the novel process are pastes, for example dispersions of polymers in a substrate such as water, or solutions of polymers in a solvent, the dispersions or solutions not being solid at room temperature. The novel process may also be used to thicken such pastes by removing a proportion of the substrate or solvent. Examples of suitable pastes are those of dye intermediates, eg. aminocarboxylic acids, pyrimidinecarboxylic acid and nitrocarboxylic acids.

Particularly preferred starting materials for the novel process are nylons which contain volatile constituents.

The temperature used essentially depends on the melting point of the particular polymer or on its processing temperature and the boiling point of the volatile constituents. As a rule, the process is carried out at from 150° to 280° C. In the case of nylon-6, the temperature is advantageously from 230° to 270° C. and in the case of nylon-6,6 advantageously from 270° to 280° C. In the treatment of pastes, the temperature essentially depends on the boiling point of the substrate or solvent since, for example, when thickening dispersions the polymer should not melt, as otherwise the disperse state will not be maintained.

The polymers containing volatile constituents are fed in the molten state, and the pastes in their normal state, with continuous formation of fresh surfaces, through one or more zones in which the volatile constituents evaporate, these zones advantageously being under reduced pressure, and the volatile constituents are removed as vapor. Advantageously, the process is carried out in screw extruders having venting devices. The polymer containing volatile constituents can be fed as granules to the extruder. In that case, the polymer becomes molten in the screw extruder and the volatile constituents are removed in the venting zone, through the venting orifice, advantageously under reduced pressure. On the other hand it is also possible to feed the polymers containing volatile constituents to the extruder as a melt, such as is obtained in the polymerization reaction. The pressure used depends on the boiling point of the volatile constituents to be removed and on the proportion of such constituents which are allowed to stay in the polymer. The volatile constituents are removed as vapor through venting orifices, by reducing the pressure. In the zone in which the volatile constituents are evaporated, ie. the venting zone, the pressure is preferably from about 1 to 1,000 mbar. If substantial amounts of volatile constituents have to be removed or if the content of volatile constituents in the polymer is to be reduced to very low levels it has proved advantageous to pass the polymer melt containing the volatile constituents through a plurality, for example two, zones connected in series, in which the volatile constituents are evaporated.

According to the invention, the volatile constituents are removed from the zone or zones in which they are evaporated through, in each case, a plurality of porous orifices. Suitable arrangements for this purpose are porous plates such as sintered plates, for example of metal, ceramics or high-melting polymers, as well as metal fiber plates. Sintered plates of metal and metal fiber plates are particularly preferred. The porous orifices advantageously have a diameter of from 5 to 200 μm and the porosity is advantageously from 25 to 60%. The porous plates advantageously form a part of the barrel wall and match the shape of the latter, ie. the entire cross-section of the venting orifice is separated from the polymer melt or paste by a sintered plate which matches the shape of the barrel. As a result of the prevailing pressure, the volatile constituents can escape through the fine pores of the sintered plate while the melt penetrates the porous plate to only a very minor degree, if at all. However, neither condensing volatile constituents nor melt or paste which has penetrated through the porous plate can pass back into the polymer melt or paste being treated. It is advantageous to ensure that the polymer melt or paste being treated exerts very little pressure on the porous plate.

The polymer melt thus treated is substantially discharged and molded, for example extruded as strands and granulated or directly shaped into moldings, for example pipes, or fed to a further processing stage.

The process according to the invention is advantageously carried out in an apparatus for removing volatile constituents from a polymer melt or paste, which comprises an extruder barrel 1 having a feed orifice 2 for polymers containing volatile constituents, a discharge orifice 3 and one or more venting orifices 4 as well as one or more screws 5, a porous plate 6 covering the entire cross-section of the venting orifice being arranged in each venting orifices.

FIG. 1 shows an example of a suitable apparatus. In this figure, 1 is an extruder barrel, 2 is a feed orifice for a polymer containing volatile constituents, 3 is a discharge orifice, 4 is a venting orifice for removing the volatile constituents, 5 is a screw and 6 is a porous plate which covers the entire cross-section of the venting orifice.

Advantageously, sintered metal plates having a pore diameter of from 5 to 200 μm and a porosity of from 25 to 60% are used. Advantageously, the sintered metal plate matches the shape of the extruder barrel. It has also proved advantageous to have the sintered metal plate movable at right angles to the screw axis, so that the gap between the sintered metal plate and the external screw diameter can be regulated. Preferably, the gap width is adjusted in accordance with the viscosity of the melt to be treated to be about half the distance between the barrel and the external screw diameter.

For the removal of volatile constituents from polymer melts, extruders with a single screw or with a plurality of screws, for example with twin screws, may be used. The extruder barrel may also possess a plurality of venting orifices, for example two arranged in series between the feed orifice and the discharge orifice. Each venting orifice is of course equipped with a sintered plate which covers the entire cross-section of the orifice. Feed orifices for lubricants, stabilizers or other additives may be provided between the last venting orifice (viewed in the direction of the discharge orifice) and the discharge orifice.

Figure 2:
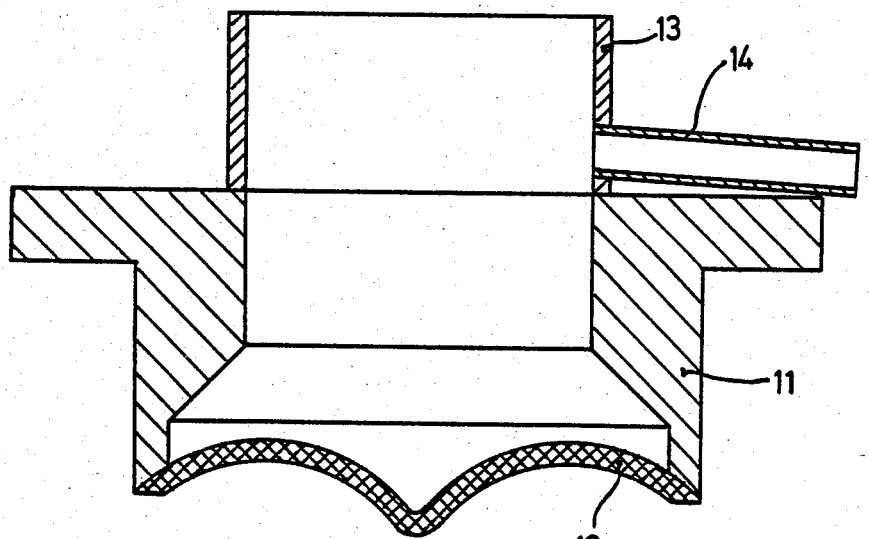

A particularly advantageous embodiment of the apparatus is achieved with the use of an insert which is shown in FIG. 2 and which is introduced in a tightly closing manner into the venting orifice 4. In FIG. 2, 11 is an insert, 12 is a porous plate, 13 is a nozzle for connection to the vacuum line for removing the volatile constituents and 14 is a discharge orifice for removing condensed oligomers or polymers which pass through the porous plate.

The Examples which follow illustrate the invention.

EXAMPLE 1

A melt of nylon-6,6 containing from 1.5 to 2% by weight of water is released, at 280° C., from a continuously operated apparatus which is under a water vapor pressure of about 10 bar, via a gear pump, into the feed orifice of a devolatilizing extruder, at a rate corresponding to a throughput of 50 kg/hour. The devolatilizing extruder is a twin-screw extruder with a length: diameter ratio of 20:1. A venting orifice provided with a sintered metal insert as shown in FIG. 2 is located along the extruder barrel. The screw geometry is of course appropriate to the conventional procedures. The sintered metal plate matches the geometry of the barrel. The play between the screws and the sintered metal plate is about 0.5 mm. The sintered metal plate has a porosity of 30%, a pore diameter of 20 μm and a surface area of about 80 cm$^2$. The venting orifice is subjected to 600 mbar suction. As the nylon-6,6 melt, containing water vapor, passes the venting orifice the water vapor is released, passes through the sintered metal plate and is drawn off. The amount of vapor removed is about 2% by weight, based on the polymer melt. The viscosity of the polymer melt to be devolatilized is about 30 Pas at 275° C. The difference in pressure between the melt being devolatilized, below the insert, and atmospheric pressure is about 40 mm water column. The polymer melt is so effectively devolatilized under these conditions without leaving objectionable polymer deposits, that there are no adverse effects from residual volatiles on the subsequent solidification of the extruded strands and the granulation which follows. Using this procedure, trouble-free sustained operation for about 4 weeks proved possible.

EXAMPLE 2

During compounding in a twin-screw extruder (L:D=45:1), about 23% of water (based on starting materials) is abstracted from the nylon-6 under atmospheric pressure. The polymer throughput is 40 kg/h, the material temperature in the extruder from 260° to 290° C. and the screw speed 150 rpm. The product is fed into the first section of the barrel. The volatile constituents are evaporated in the subsequent closed sections of the barrel and are taken off via two sintered metal inserts which match the screw profile. The venting surface areas are 80 cm$^2$ per venting orifice and the distance between the sintered metal plate and the screw is 0.5 mm. The sintered metal is made from RA4, the porosity is 35% and the plate is 3 mm thick. The melt viscosity of the nylon-6 used is 120 Pas at 280° C. The polymer loss through the sintered metal inserts is 0.1%, based on throughput, in sustained operation. The polymer melt cannot become contaminated by deposits formed in the venting orifices. During sustained operation for more than 48 hours, trouble-free devolatilization of the polymer melt coupled with entirely satisfactory granulation proved possible.

We claim:

1. A process for removing volatile constituents from a polymer melt in a vented extruder, which comprises
   (a) passing the polymer melt containing the volatile constituents through one or more zones, with continuous formation of fresh surfaces,
   (b) evaporating volatile constituents from this polymer melt in one or more such zones, and
   (c) removing the vapors of volatile constituents, thus produced, from the zone or zones via a porous plate having a porosity of from 25 to 60% and a pore diameter of from 5 to 200 μm.

* * * * *